US008356111B2

(12) United States Patent  (10) Patent No.: US 8,356,111 B2
Luzzatti et al.  (45) Date of Patent: *Jan. 15, 2013

(54) METHOD FOR BUFFER MANAGEMENT FOR VIDEO SWARMS IN A PEER-TO-PEER NETWORK

(75) Inventors: Omer Luzzatti, Tel Aviv (IL); Jonathan Zion Mozes, Tel Aviv (IL); Jonathan Stern, Tel Aviv (IL); Tal Fromchenko, Tel Aviv (IL)

(73) Assignee: Ray-V Technologies, Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,389

(22) Filed: Oct. 24, 2011

(65) Prior Publication Data

US 2012/0042093 A1     Feb. 16, 2012

Related U.S. Application Data

(63) Continuation of application No. 12/473,006, filed on May 27, 2009, now Pat. No. 8,051,194.

(51) Int. Cl.
*G06F 15/16* (2006.01)
(52) U.S. Cl. ........................ 709/231; 709/223
(58) Field of Classification Search .................. 709/231, 709/223–224, 217
See application file for complete search history.

(56) References Cited

U.S. PATENT DOCUMENTS

| | | | |
|---|---|---|---|
| 7,200,669 B2* | 4/2007 | Cheung et al. | 709/231 |
| 7,672,235 B1 | 3/2010 | Lian et al. | |
| 7,733,808 B2* | 6/2010 | Hu et al. | 370/256 |
| 7,742,504 B2 | 6/2010 | Zimmermann et al. | |
| 7,827,458 B1 | 11/2010 | Salsbury et al. | |
| 8,051,194 B2* | 11/2011 | Luzzatti et al. | 709/231 |
| 2004/0125816 A1 | 7/2004 | Xu et al. | |
| 2008/0112315 A1 | 5/2008 | Hu et al. | |
| 2008/0133767 A1* | 6/2008 | Birrer et al. | 709/231 |

(Continued)

FOREIGN PATENT DOCUMENTS

WO     2007/110865     10/2007

(Continued)

OTHER PUBLICATIONS

Francisco De Asis Lopez-Fuentes, et al., "Architecture for Media Streaming Delivery over P2P Networks", Institute of Communication Networks, Media Technology Group, Technische Universitat Munchen, Munich, Germany, Lecture Notes in Computer Science: Advanced Distributed Systems, Aug. 31, 2005, pp. 72-82, vol. 3563/2005, Springer, Berlin/Heidelberg, Germany.

(Continued)

*Primary Examiner* — Philip B Tran
(74) *Attorney, Agent, or Firm* — Myers Wolin, LLC

(57) ABSTRACT

A buffer for buffing multimedia content to enable reliable streaming of multimedia content in a peer-to-peer network. The buffer comprises a first section being loaded with a first portion of the multimedia content during a first time interval, wherein the first portion of the multimedia content is retrieved from at least one resource node; and a second section being loaded with a second portion of the multimedia content during a second time interval, wherein the second portion of the multimedia content is retrieved from at least one reliable node during a second time interval, wherein the buffer continuously delivers the multimedia content including the first and second portions thereof to a consumer node.

13 Claims, 4 Drawing Sheets

U.S. PATENT DOCUMENTS

2008/0159233 A1* 7/2008 Achtari et al. ............... 370/332
2010/0094968 A1* 4/2010 Zuckerman et al. .......... 709/231

FOREIGN PATENT DOCUMENTS

WO 2008/038280 4/2008

OTHER PUBLICATIONS

Eckehard Steinbach, et al., "Adaptive Playout for Low Latency Video Streaming", Information Systems Laboratory, Department of Electrical Engineering, Stanford University, Proceedings, 2001 International Conference on Image Processing, Oct. 7-10, 2001, pp. 962-965, vol. 1.

Xinyan Zhang, et al., "CoolStreaming/DONet: A Data-Driven Overlay Network for Efficient Live Media Streaming", pp. 1-14, IEEE INFOCOM '05, Miami, FL., USA, Mar. 2005.

Mohamed Hefeeda, et al., "Promise: Peer-to-Peer Media Streaming Using CollectCast", ACM Multimedia '03, pp. 45-54, Nov. 2003.

* cited by examiner

METHOD FOR BUFFER MANAGEMENT FOR VIDEO SWARMS IN A PEER-TO-PEER NETWORK

CROSS REFERENCE TO RELATED APPLICATIONS

This application is a continuation application of U.S. patent application Ser. No. 12/473,006, filed on May 27, 2009, which is incorporated herein in its entirety by reference thereto.

TECHNICAL FIELD

The present invention relates generally to the field of network communication and media distribution in a peer-to-peer (P2P) network, and more specifically to buffering techniques to ensure continued quality of, for example a video display, at a node.

BACKGROUND OF THE INVENTION

The ubiquity of the Internet enables new techniques adaptation to enable direct distribution of multimedia files and real-time media streaming to end-users in an electronic format. The advantages associated with electronic distribution allow media content providers to establish global distribution systems for digital content. Furthermore, new compression algorithms, designed specifically for multimedia data, dramatically reduce the bandwidth and storage space required for the electronic distribution of multimedia data. This, together with the availability of broadband communication, encourages content providers to adopt the Internet as an alternate distribution system complementing the conventional distribution systems (e.g., cable or satellite TV).

Peer-to-peer (P2P) or grid networks enable the distribution of media between users without using server centric solutions. As an example, P2P file sharing systems are well known in the industry and use a very efficient technology to deliver media. Examples for such P2P systems are BitTorrent® and Gnutella. However, these systems do not distribute the content in real-time. Rather, a user can download the content (files) and view it only when the download has completed, i.e., a user cannot view the file (e.g., a movie) while downloading it.

Recently, new systems for real-time streaming over P2P networks have been developed. Examples for such systems may be found in "A Data Driver Overlay Network for Efficient Live Media Streaming" by Zhang, et al. and in "Peer-to-Peer Media Streaming Using CollectCast", by Hefeeda, et al., both of which are incorporated herein by reference merely for the useful understanding of the background of the invention. Real-time streaming systems fail to fully utilize the network's resources, as they do not consider the asymmetric nature of the nodes (peers) in a typical Internet protocol (IP) network.

Generally, such systems consider the upload bandwidth of nodes as equal to the download bandwidth. This is rarely the case in IP networks, such as asymmetric digital subscriber line (ADSL) and cable based networks, as in most cases a node's upload bandwidth is half or less of the bandwidth of the download. Another type of real-time P2P network for distributing media can be found in PCT application number PCT/IL2007/000392 entitled "Realtime Media Distribution in a P2P Network", by Omer Luzzatti, et al (hereinafter "Luzzatti") which is assigned to common assignee and incorporated herein by reference merely for the useful understanding of the background of the invention. Luzzatti discloses a real-time P2P network where nodes in the network can act in the role of 'amplifiers' to increase the total available bandwidth made available in the network and thus to improve the quality of the media consumed by the viewers.

In such systems, where the video delivery to an accepting node is from one or more donating nodes, it is essential to maintain the quality of the video content. That is, it is important to make sure that video streams continue to be pleasurable to the eye and ear. A common approach to address this requirement is to have a buffer that buffers a few seconds of the data stream delivered to the accepting node. However, due to changes in network traffic patterns, or the availability of a donating node to provide data to the accepting node, such phenomenon occurs and results in undesirable visual or audio appearance.

It would be therefore advantageous to provide a solution for managing the loading of a buffer utilized in a multimedia delivery system to enable high quality reception of both video and audio contents.

SUMMARY OF THE INVENTION

Certain embodiments disclosed herein include a buffer for buffing multimedia content to enable reliable streaming of multimedia content in a peer-to-peer network. The buffer comprises a first section being loaded with a first portion of the multimedia content during a first time interval, wherein the first portion of the multimedia content is retrieved from at least one resource node; and a second section being loaded with a second portion of the multimedia content during a second time interval, wherein the second portion of the multimedia content is retrieved from at least one reliable node during a second time interval, wherein the buffer continuously delivers the multimedia content including the first and second portions thereof to a consumer node.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

Figure 1:
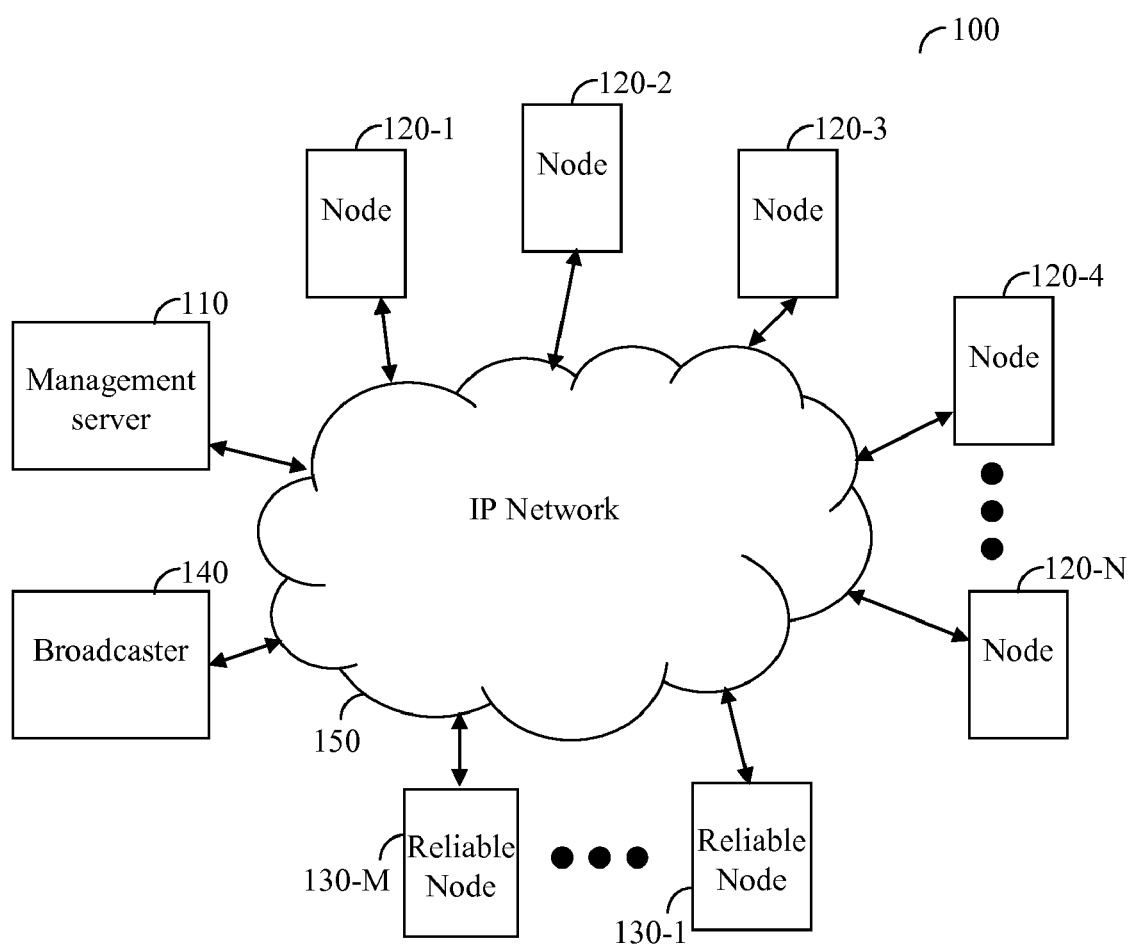
FIG. 1 is a diagram of a P2P network used to describe the principles of the present invention.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments include a method for management loading of a buffer with multimedia (e.g., video and audio) contents, where the buffer is part of a node receiving video swarms in a peer-to-peer (P2P) network. Nodes in the network are connected to other nodes that are providers of portions of the video content as well as to one or more reliable nodes of the P2P network. In order to ensure good quality of video display, the buffer first retrieves initial data from a reliable node, then from other nodes to which the receiving node is connected, and then, the last portion, typically measure in time, of the buffer is filled again from a reliable node. A reliable node is a node that is guaranteed to provide multimedia data to other nodes connected to the reliable node. This approach balances loads between nodes as well as provides assurance against jitters.

FIG. 1 shows a non-limiting and exemplary block diagram of a P2P network 100 used to describe the principles of the invention. The P2P network 100 includes a plurality of nodes (peers) 120-1 through 120-N (collectivity referred to as nodes 120), reliable nodes 130-1 through 130-M (collectivity referred to as nodes 130), and a broadcaster 140, all of which communicate with each other over an Internet protocol (IP) network 150. The P2P network 100 may further include a centralized management server 110. The P2P network 100 is utilized to distribute content in several parallel (and alternative) "channels". For example, the P2P network 100 may distribute several unrelated channels (e.g., TV-like channels) of real-time streaming media, with viewers who can choose to view one particular stream at a time. In a preferable implementation there will be at least two reliable nodes 130.

The nodes 120 and reliable nodes 130, distributing the content of a particular channel, constitute a "channel swarm". The nodes 120 may be, but are not limited to, personal computers, servers, portable media devices, media control devices, set-up boxes, or any other device capable of exchanging data with other nodes connected to it. A node may also refer to a module of a software system such as a media player application. Each node 120 can act as a consumer-node and/or a resource-node. Typically, reliable nodes 130 are used only for the purpose of providing content and such nodes receive content from a broadcaster 140. In a typical embodiment of the invention reliable nodes 130 are placed at central points of the network 150 that are considered to be valuable for the distribution of data. For example, a certain geographical area, for example, a town may have one or two reliable nodes 130 in general network proximity to the nodes 120 it may serve. A reliable node may be relied to provide a consistent bandwidth and be generally available to the nodes it serves, unlike the other resource nodes, as explained below, which may be available or unavailable, or change bandwidth, over relatively short periods of time.

A consumer-node, also referred to as an acceptor or viewer, is a node 120-c (where c is an integer greater than or equal to 1) that belongs to an end-user who wants to watch a channel (i.e., to consume the real-time content). Each consumer-node is constrained to join one or more channel-swarms as determined by the end-user, and must receive a complete, consumable stream of the real-time content. An end-user can view media content broadcasted in a channel on a display connected to the consumer-node. This includes, but is not limited to, a TV screen connected to a set-up box, a monitor connected to a personal computer, a portable multimedia device, and the like. It should be noted that a consumer node may operate also a resource node, or a donor, to another node 120 of the network 150.

A resource-node is a node 120-r (where r is an integer greater than or equal to 1) with an available upload bandwidth that can be contributed to the one or more channel-swarms. In accordance with one embodiment a resource-node may be a dedicated network device that shares its bandwidth, but does not consume the media. Such devices are typically installed by service providers, but may also be nodes that are otherwise consumer nodes bit are presently not used for viewing of video swarms. A resource-node may be also an amplifier as described in greater detail in Luzzatti. It should be noted that different resource-nodes may have different capabilities, and in particular may be differently capable of providing resources to different consumer-nodes. The allocation of particular resource-nodes to a channel should be chosen to guarantee a certain quality of service, while minimizing the overhead associated with joining a channel swarm.

Figure 2:
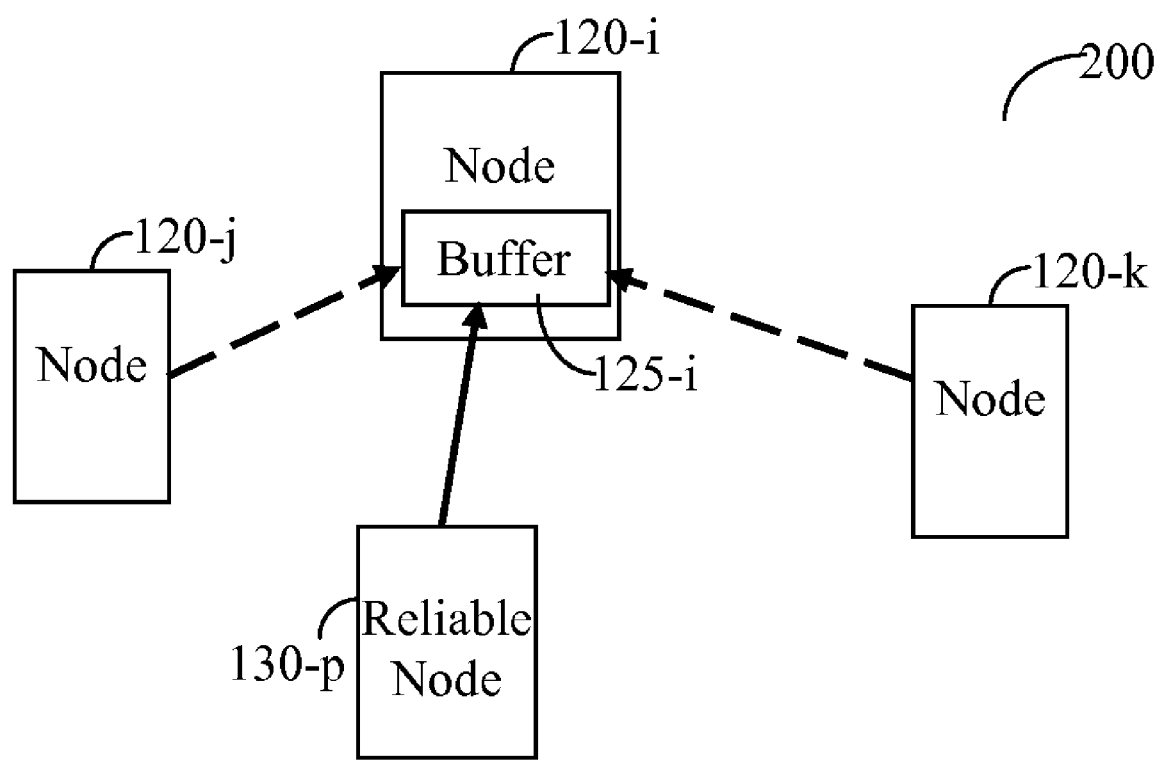
FIG. 2 is a diagram of communication between a consumer node and both resource nodes and a reliable node.

FIG. 2 shows an exemplary and non-limiting diagram 200 of communication between a consumer node and both resource nodes and at least one reliable node. In accordance with the principles of the invention the consumer node 120-i includes a buffer 125-i which requests content which it receives from three resources. Two resources are the resource nodes 120-j and 120-k. The other resource is the reliable node 130-p. As all are part of the P2P network 100 they are able to communicate and operate to provide the necessary content. Portions of the content may be provided by one node and other portions by another node. However, according to the principles of the disclosed invention a particular order must be adhered to in order to maintain the quality of the video stream provided to the consumer node 120-i.

A buffer in a consumer node 120 may be viewed as comprising three time intervals: a lead time interval, a middle time interval, and a trailing time interval. For example, the buffer 125-i may be able to contain a total of five seconds of content. In one embodiment the lead time interval of the buffer will contain a period of one second and so will the trailing time interval which will also be one second. The middle time interval will therefore consist of a period of three seconds. To provide content for both the lead time interval and the trailing time interval the node 120-i will receive data preferably from the reliable node 130-p while the data for the middle time interval is to be provided from the nodes 120-j and 120-k, as well as from reliable node 130-p if it is also available to do so. Each consumer node is always directed to use specific reliable nodes 130. In one embodiment the consumer node 120-i is further directed to a preference list between reliable nodes 130, such that one such node may be more preferable for use by the node 120-i over another reliable node. Furthermore, in a typical application, consumer node 120-i periodically checks to which resource nodes 120 it is connected as well as to the reliable nodes 130 and determines if any changes are to be made.

Figure 3:
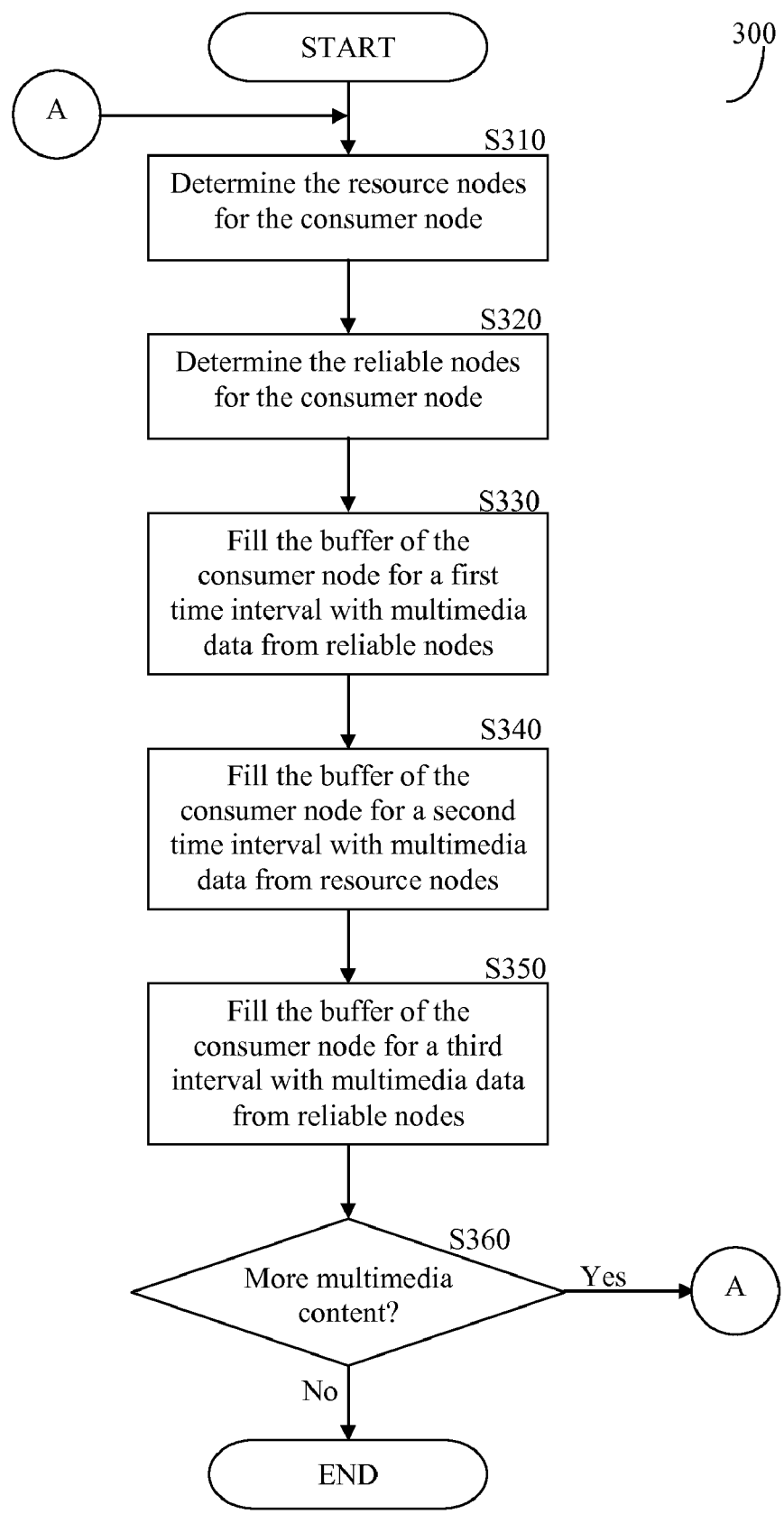
FIG. 3 is a flowchart demonstrating the principles of operation of buffer loading of a consumer node by both resource nodes and a reliable node implemented in accordance with an embodiment of the invention.

FIG. 3 shows an exemplary and non-limiting flowchart 300 demonstrating the principles of operation of the buffer loading of a consumer node by both resource nodes and reliable nodes implemented in accordance with an embodiment of the invention. In S310 the resource nodes, to be used by the consumer node, are determined from a list of potential consumer nodes. In S320 the reliable nodes, to be used by the consumer node, are determined from a list of potential reliable nodes. In one embodiment of the disclosed invention S320 is optional. Typically, at least two reliable nodes will be used. In S330 the consumer node loads the leading time zone of its buffer with data from selected reliable nodes. In S340 the consumer node loads the middle time zone of its buffer with data from selected resource nodes. In S350 the consumer node loads the trailing time zone of its buffer with data from selected reliable nodes. In one embodiment of the disclosed invention any missing data not provided for in the buffer's middle time zone is also requested from the reliable nodes so as to enable smooth video transfer.

In S360 it is checked whether additional data is to be provided, and if so execution continues with S310; otherwise, execution terminates. The result of this implementation is a balanced loading between "volunteer" resource nodes which is the typical operation of nodes 120 and the reliable nodes 130 that kick-in to provide the refinement of the performance of the overall video delivery but relying on the resource nodes 120 to provide the bulk of the content.

Figure 4:
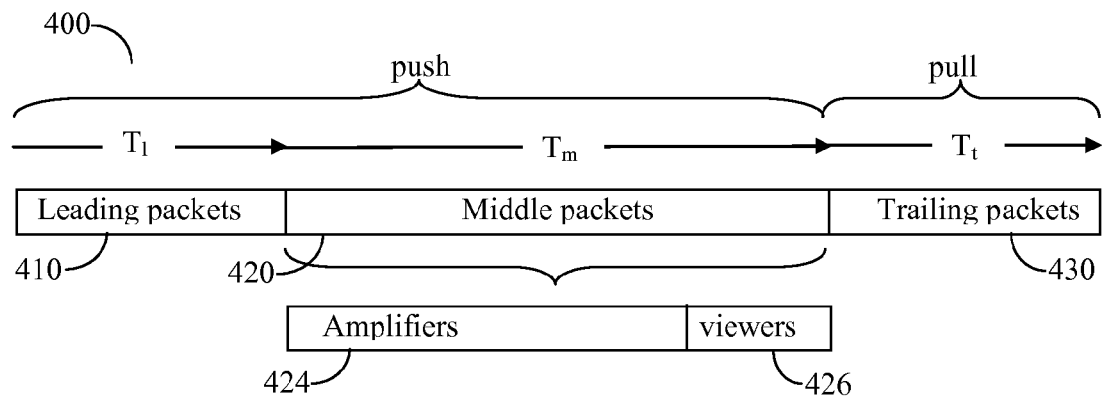
FIG. 4 is a timing diagram describing sources for packets provided in accordance with the invention.

To further comprehend the method of operation in accordance with the invention reference is now made to FIG. 4 where an exemplary and non-limiting timing diagram 400 describing sources for packets provided in accordance with an embodiment of the invention is shown. The operation is generally divided between two time periods, one being a push period and the other being a pull period. During the push period packets are pushed from a source node(s) to a destination node(s) while in the pull period, during time interval $T_t$ 430, packets are specifically requested by a destination node from a source node(s) to account for specific packets determined to be missing for the purpose of smooth reproduction of video swarms. The push period has two separate time intervals, $T_l$ 410 and $T_m$ 420. In time interval 410 the leading packets, i.e., those packets which should be used first for the video swarm, are pushed from one or more reliable nodes 130. The length of time of such time interval is determined by the characteristics of the network and at a minimum may be zero, but typically would account for at least one second of the buffer (e.g., buffer 125-$i$) content, when the buffer holds 5 seconds of multimedia content.

During time interval 420 packets are received by the destination node from other nodes in the network, typically nodes 120. These nodes may be one of two types of nodes, one is referred to as an amplifier node, i.e., a node which is currently used for the transfer of data but no viewing is actively occurring on that node, or from a viewer node, i.e., a node that both provides bandwidth for transferring of video swarm packets but at the same time its user is using some of the bandwidth for the purpose of viewing one or more video swarms. In one embodiment the time interval 420 is divided into two time intervals, one time interval 424 where packets are received from amplifiers, and a subsequent time interval 426 where the packets are received from viewers. Typically, in a 5-second buffer 125-$i$, time interval 424 amounts to 2 seconds while time interval 426 amounts to 1 second. The reason for using such a scheme, i.e., identifying the nodes as amplifier nodes and viewer nodes for this purpose, is to enable to ensure the quality of service (QoS) for all the users of the system 100.

For the last time interval 430, i.e., filling up the last portion of the buffer 125, typically a 1 second period, packets are requested from a reliable node 130, to ensure that all the necessary packets for smooth viewing of a video swarm are actually available. In one embodiment of the invention, the ratios between the various time periods discussed hereinabove are programmable may be dynamically changed responsive to changes in network bandwidth availability, availability of amplifier nodes, availability of viewer nodes, and availability of reliable nodes.

Figure 5:
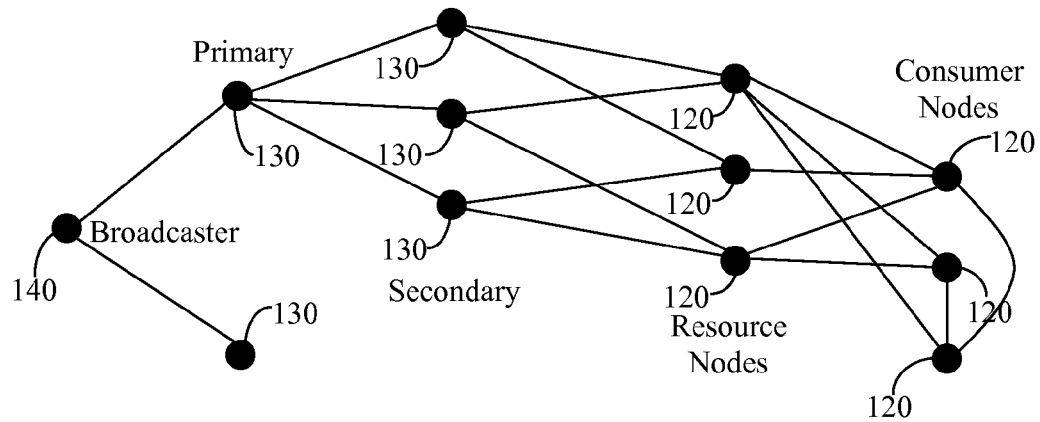
FIG. 5 is a data connectivity diagram describing the connections between the nodes provided in accordance with the invention.

FIG. 5 provides an exemplary and non-limiting data connectivity diagram describing the connections between the nodes in accordance with the invention. A broadcaster 140 is connected to one or more primary reliable nodes 130, each primary reliable node 130 connected optionally to one or more secondary reliable nodes 130. Using this kind of option configuration of primary and secondary reliable nodes may improve the QoS. Consumer nodes 120 connects to other consumer-nodes 120, to resource nodes 120 (i.e., nodes which are at least not currently used in a viewing mode), and to secondary reliable nodes 130, if those exist, or otherwise, directly to primary reliable nodes 130. The timeslots during which a viewer either receives (in push mode) or demands (in pull mode) was described in more detail hereinabove with respect to FIG. 4.

The various embodiments discussed herein may be implemented in hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What we claim is:

1. A buffer for buffing multimedia content to enable reliable streaming of multimedia content in a real-time peer-to-peer network, comprising:
   a first section being loaded with a first portion of the multimedia content during a first time interval, wherein the first portion of the multimedia content is retrieved from at least one resource node, wherein the at least one resource node is a node in the real-time peer-to-peer network that has an available upload bandwidth that can be contributed to a channel swarm; and
   a second section being loaded with a second portion of the multimedia content during a second time interval, wherein the second portion of the multimedia content is retrieved from at least one reliable node during a second time interval, wherein the buffer continuously delivers the multimedia content including the first and second portions thereof to a consumer node, wherein the at least one reliable node receives the multimedia content directly from a broadcaster and is guaranteed to provide the multimedia content to at least the consumer node connected thereto, wherein the consumer node, the least one resource node and the at least one reliable node constitute the channel-swarm of a particular broadcast television channel in the real-time peer-to-peer network.

2. The buffer of claim 1, wherein the second time interval being subsequent to the first time interval.

3. The buffer of claim 2, wherein the buffer further comprises a third section being loaded a third portion of the multimedia content by accessing at least one reliable node for multimedia content during a third time interval, the third time interval occurring prior to the first time interval.

4. The buffer of claim 3, wherein the communication in the third time interval is in a push mode.

5. The buffer of claim 3, wherein the buffer is a tangible storage structured to include at least the first section, the second section and the third section, wherein at least one of the first section, the second section, and the third section has a variable length.

6. The buffer of claim 1, wherein the communication in the first time interval is in a push mode and the communication in the second time interval is in a pull mode.

7. The buffer of claim 1, wherein the buffer is filled during the second time interval with the multimedia content of the first time interval which the at least one resource node was unable to deliver.

8. The buffer of claim 1, wherein the first section is being loaded with a fourth portion retrieved from another consumer node in the peer-to-peer network during a fourth time interval, wherein the fourth time interval is within the first time interval and immediately precedes the second time interval.

9. The buffer of claim 8, wherein the length of time of each of the first time interval, the second time interval, the third time interval, and the fourth time interval is programmable.

10. The buffer of claim 9, wherein each of the length of time of each of the first time interval, the second time interval, the third time interval, and the fourth time interval is dynamically programmable by the consumer node.

11. The buffer of claim 1, wherein the buffer is a tangible storage structured to include at least the first section and the second section wherein at least one of the first section and the second section has a variable length.

12. The buffer of claim 1, wherein the at least one reliable node is configured to guarantee delivery of the multimedia content to the consumer node.

13. The buffer of claim 1, wherein the multimedia content comprises at least one of: video, audio.

* * * * *